United States Patent
Vogt (10) Patent No.: US 11,688,926 B2
(45) Date of Patent: *Jun. 27, 2023

(54) WIRELESS REACTOR MONITORING SYSTEM USING PASSIVE SENSOR ENABLED RFID TAG

(71) Applicant: SHELL OIL COMPANY, Houston, TX (US)

(72) Inventor: Kaspar Joseph Vogt, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/960,783

(22) PCT Filed: Jan. 9, 2019

(86) PCT No.: PCT/US2019/012843
§ 371 (c)(1),
(2) Date: Jul. 8, 2020

(87) PCT Pub. No.: WO2019/139946
PCT Pub. Date: Jul. 18, 2019

(65) Prior Publication Data
US 2020/0350656 A1    Nov. 5, 2020

Related U.S. Application Data

(60) Provisional application No. 62/616,166, filed on Jan. 11, 2018.

(51) Int. Cl.
*H01Q 1/22* (2006.01)
*H04W 4/38* (2018.01)

(52) U.S. Cl.
CPC .......... *H01Q 1/225* (2013.01); *H01Q 1/2233* (2013.01); *H04W 4/38* (2018.02)

(58) Field of Classification Search
CPC .. H01Q 1/225; H01Q 1/2233; H01Q 2209/47; H04W 4/38; B01J 8/025;
(Continued)

(56) References Cited

U.S. PATENT DOCUMENTS 3,710,737 A * 1/1973 Birk .......................... C10G 9/40
110/342
4,590,466 A   5/1986 Wiklund et al.
(Continued)

FOREIGN PATENT DOCUMENTS

CN    101866432 A    10/2010
CN    102324163 A     1/2012
(Continued)

OTHER PUBLICATIONS

CN103714371, by Ying et al., Machine Translation. (Year: 2014).*
(Continued)

*Primary Examiner* — Awat M Salih
(74) *Attorney, Agent, or Firm* — Shell USA, Inc.

(57) ABSTRACT

Disclosed is a system and method for wirelessly monitoring process conditions within a reactor vessel. A sensor-enabled radio frequency identification tag is located within a catalyst bed of a vessel and used to measure various conditions within the vessel. The sensor-enabled RFID tag is wirelessly linked to a reader for transmitting interrogation signals and for receiving transponder signals from the sensor-enabled RFID tag that carry information representative of the measured condition.

28 Claims, 4 Drawing Sheets

(58) Field of Classification Search
CPC .... B01J 2208/00061; B01J 2208/00539; B01J 2208/00548; B01J 2208/00584; B01J 2208/00592; B01J 2208/00628; B01J 2208/00734; G06K 19/0723

See application file for complete search history.

(56) References Cited

U.S. PATENT DOCUMENTS

| | | | |
|---|---|---|---|
| 6,301,546 | B1 | 10/2001 | Weinstein et al. |
| 6,720,866 | B1 | 4/2004 | Sorrells et al. |
| 7,250,863 | B2 | 7/2007 | Nemoto et al. |
| 7,397,370 | B2 | 7/2008 | Bratkovski |
| 7,547,421 | B2 * | 6/2009 | McSherry ............ B01J 19/0006 562/2 |
| 7,612,325 | B1 | 11/2009 | Watkins, Jr. et al. |
| 7,642,742 | B2 | 1/2010 | Curello et al. |
| 7,846,397 | B2 * | 12/2010 | Gregg .................... G01K 1/024 374/E1.001 |
| 7,919,326 | B2 | 4/2011 | Angell et al. |
| 8,106,778 | B2 | 1/2012 | Killian et al. |
| 8,257,875 | B2 | 9/2012 | Rea et al. |
| 8,277,733 | B2 | 10/2012 | Mcsherry et al. |
| 8,298,420 | B2 | 10/2012 | Burrows |
| 8,658,024 | B2 * | 2/2014 | Long .................... B01J 27/1853 502/68 |
| 9,035,766 | B2 | 5/2015 | Worthington et al. |
| 9,317,795 | B2 | 4/2016 | Forster |
| 9,402,544 | B2 | 8/2016 | Yee et al. |
| 9,412,061 | B2 | 8/2016 | Forster |
| 9,563,833 | B2 | 2/2017 | Swager et al. |
| 9,678,030 | B2 | 6/2017 | Potyrailo et al. |
| 9,726,680 | B2 | 8/2017 | Hou et al. |
| 9,824,252 | B1 | 11/2017 | Gibson |
| 10,210,445 | B2 | 2/2019 | Nikunen et al. |
| 11,255,735 | B2 | 2/2022 | Engelstad et al. |
| 2004/0233043 | A1 * | 11/2004 | Yazawa .............. G06K 19/0723 435/6.13 |
| 2007/0215709 | A1 | 9/2007 | Baude et al. |
| 2008/0114228 | A1 | 5/2008 | McCluskey et al. |
| 2009/0092522 | A1 | 4/2009 | Gregg et al. |
| 2009/0231127 | A1 * | 9/2009 | Angell ............. G06K 19/07749 340/539.22 |
| 2009/0301382 | A1 | 12/2009 | Patel |
| 2010/0066501 | A1 | 3/2010 | Ulrich et al. |
| 2010/0070084 | A1 | 3/2010 | Steinberg et al. |
| 2010/0230324 | A1 | 9/2010 | Al-alloush |
| 2012/0219101 | A1 | 8/2012 | L'Abbate et al. |
| 2013/0057390 | A1 | 3/2013 | Watt et al. |
| 2013/0284812 | A1 | 10/2013 | Cok et al. |
| 2014/0024121 | A1 | 1/2014 | Osso et al. |
| 2014/0294041 | A1 | 10/2014 | Zhang et al. |
| 2015/0268079 | A1 * | 9/2015 | Lund ...................... G01F 1/704 235/375 |
| 2015/0360343 | A1 | 12/2015 | Yavelberg |
| 2016/0273953 | A1 | 9/2016 | Schlensker |
| 2016/0315705 | A1 | 10/2016 | Langguth et al. |
| 2016/0364680 | A1 | 12/2016 | Debates et al. |
| 2017/0092090 | A1 | 3/2017 | Lerner |
| 2017/0188908 | A1 | 7/2017 | Hoss et al. |
| 2017/0253815 | A1 * | 9/2017 | Nouri .................... C10G 47/02 |
| 2017/0286820 | A1 | 10/2017 | Nikunen et al. |

FOREIGN PATENT DOCUMENTS

| | | |
|---|---|---|
| CN | 102867199 A | 1/2013 |
| CN | 103714371 A | 4/2014 |
| EP | 1022548 A1 | 7/2000 |
| JP | 6234883 B2 | 11/2017 |
| TW | 201229471 A | 7/2012 |
| TW | 201504950 A | 2/2015 |
| WO | 2003098175 A1 | 11/2003 |
| WO | 2012104230 A1 | 8/2012 |
| WO | 2014062066 A1 | 4/2014 |
| WO | 2016202971 A1 | 12/2016 |
| WO | 2019139946 A1 | 7/2019 |
| WO | 2019139953 A1 | 7/2019 |
| WO | 2019139974 A1 | 7/2019 |

OTHER PUBLICATIONS

International Search Report and Written Opinion received for PCT Patent Application No. PCT/US2019/012843, dated Apr. 11, 2019, 9 pages.

Office Action Received for Chinese Application No. 2019800067394, dated Apr. 21, 2022, 12 Pages(5 Pages of English Translation and 7 Pages of Official Copy).

Office Action Received for CN Application No. 201980007605.4, dated Sep. 3, 2021, 24 Pages(15 Pages of English Translation and 09 Pages of Official Copy).

International Search Report and Written Opinion received for PCT Patent Application No. PCT/US2019/012882, dated Apr. 11, 2019, 9 pages.

International Search Report and Written Opinion received for PCT Patent Application No. PCT/US2019/012876, dated Apr. 11, 2019, 10 pages.

International Search Report and Written Opinion received for PCT Patent Application No. PCT/US2019/012853, dated Apr. 8, 2019, 10 pages.

Decision on Grant Received for Russian Application No. 2020124744, dated Jun. 8, 2022, 24 Pages(10 Pages of English Translation and 14 Pages of Official Copy).

Office Action Received for Taiwan Application No. 108100801, dated May 30, 2022,13 Pages(5 Pages of English Translation and 8 Pages of Official Copy).

Office Action Received for Russian Application No. 2020122865, dated Jul. 20, 2022, 13 Pages(6 Pages of English Translation and 7 Pages of Official Copy).

Office Action Received for Taiwan Application No. 108100802, dated Aug. 5, 2022,10 Pages(10 Pages of Official Copy).

Office Action Received for Russian Application No. 2020123240, dated Jul. 20, 2022, 17 Pages(8 Pages of English Translation and 9 Pages of Official Copy).

Office Action Received for Taiwan Application No. 108100883, dated Jul. 15, 2022, 9 Pages(9 Pages of Official Copy).

Office Action Received for Indian Application No. 202047028592, dated Jun. 13, 2022, 5 Pages (5 Pages of Official Copy).

Office Action Received for Japanese Application No. 2020-538695, dated Feb. 7, 2023, 15 Pages (10 Pages of English Translation and 5 Pages of Official Copy).

* cited by examiner

WIRELESS REACTOR MONITORING SYSTEM USING PASSIVE SENSOR ENABLED RFID TAG

CROSS REFERENCE TO RELATED APPLICATIONS

The present application claims the benefit of U.S. Provisional Patent Application Ser. No. 62/616,166, filed on 11 Jan. 2018, the entire disclosure of which is hereby incorporated by reference.

FIELD OF THE INVENTION

The invention relates to a system and method for wireless monitoring of conditions within a process vessel such as a reactor.

BACKGROUND

Reactor vessels containing catalyst are common to refineries and chemical plants. In operating these reactors, it is desirable to measure or monitor the process conditions inside the vessel because this information can help in controlling the reaction conditions within the reactor vessel. Current methods for measuring the conditions inside a reactor vessel require having a physical connection, such as an electrical or pneumatic connection, to the sensor that transmits sensor-measured information for external display. One example of such measurement means is the use of thermocouples to measure temperature. In order to use a thermocouple to measure the temperature at a location within a reactor vessel, a thermowell is necessary. The thermowell is installed through the vessel wall, and it extends to a location at which temperature is measured within the vessel.

It is desirable to have the ability to measure and observe process conditions at locations within a reactor vessel and to wirelessly transmit the information for collection at a different location. We have proposed the possible use of sensor enabled RF identification tags for measuring various environmental conditions within a reactor volume and wirelessly transmitting the measured information for remote collection. The art discloses varieties of systems that include radio frequency identification tag devices coupled in some way with a sensor device that are used to measure certain environmental conditions and wirelessly transmit this information.

An example of such a device is described in U.S. Pat. No. 6,720,866. This patent discloses a system that includes a radio frequency identification (RFID) tag device having a sensor input that causes the logic circuits within the RFID tag device to modify a signal that is transmitted by the RFID tag device. The RFID tag device is passive in that it has no internal power source. It, instead, relies on the power supplied by an RF wave generated by an RF tag reader (interrogator) that activates the RFID tag device. The RFID tag device is adapted to receive an input signal from the sensor. This sensor provides for the measurement of such things as voltage, current, resistance, frequency, pressure, temperature, acceleration, vibration, moisture content, gas percentage, density, flow rate, light intensity, sound intensity, radiation, magnetic flux, pH or other values. The sensor also provides for the generation of an analog input signal to the RFID tag device that generates a signal containing information relating to the sensor input signal. An RFID tag reader or interrogator reads this sensor input signal.

U.S. Pat. No. 8,106,778 describes another application of radio frequency identification (RFID). This patent discloses a method and system for tracking variable conditions such as location, temperature, humidity, pressure, time, date, and inertial measurement (e.g., speed and acceleration). The RFID system disclosed by the '778 patent includes an RFID sensor capable of measuring a condition at the RFID sensor. The variable information from the sensor is then stored in the memory of the RFID tag processor of the RFID sensor tag which then transmits to an RFID reader a response signal that includes the variable information representing the condition.

These patents do not disclose or suggest anything about using sensor-enabled RFID tags to measure process or environmental conditions within a reactor vessel or to wirelessly transfer information related to measured conditions within a reactor vessel for further receipt, processing and use. In fact, persons skilled in the art would not expect RF signals to be capable of transmission through a vessel that contains a volume of catalyst particles or hydrocarbons without significant distortion or attenuation, or both, of the RF signal. This is because it previously has been thought that the catalyst particles, which contain significant concentrations of catalytic metals, will cause distortion or severe attenuation of the RF waves transmitted by RFID tags and RF interrogators as they pass through the catalyst particles.

We, however, have invented a system and method that provide for local sensing of environmental or process conditions at a location within a reactor and for the wireless transmission through the reactor to a receiver of RF waves that contain information representative of a measured condition within the reactor.

SUMMARY

Accordingly, provided is a system for wirelessly monitoring process conditions within a reactor vessel. The system comprises the reactor vessel that defines a reaction zone. Within the reaction zone is a catalyst bed, comprising catalyst particles, and wherein within the catalyst bed is an RFID sensor capable of sensing a reactor condition within the reaction zone, receiving an interrogation signal, and responsive to the interrogation signal, transmitting an RFID transponder signal that includes information representative of the reactor condition. The system includes an RFID reader antenna that is wirelessly linked to the RFID sensor and is capable of transmitting the interrogation signal and receiving the RFID transponder signal that is responsive to the interrogation signal.

Also provided is a method of monitoring process conditions within a reactor vessel that defines a reaction zone within which is a catalyst bed, comprising catalyst particles. Within the catalyst bed is an RFID sensor that is wirelessly linked to an RFID reader antenna. The RFID reader antenna transmits an interrogation signal that is received by the RFID sensor. Responsive to the interrogation signal, the RFID sensor transmits an RFID transponder signal that includes information representative of a reactor condition within the reaction zone and which is received by the RFID reader antenna.

DETAILED DESCRIPTION

Embodiments of the invention include both a system and method for wirelessly monitoring certain conditions within a reactor vessel. These conditions can include process or environmental conditions, such as, the pressure or temperature at various locations within a reactor vessel, and the conditions may include parameters such as vapor and liquid percentages, flow rates, and chemical compositions of fluids contained within or passing through the reactor vessel.

Filed concurrently with this patent application are the three related provisional patent applications entitled, "SP2118-Wireless Monitoring and Profiling of Reactor Conditions Using Plurality of Sensor-Enabled RFID Tags Having Known Locations," "SP2119-Wireless Monitoring and Profiling of Reactor Conditions Using Arrays of Sensor-Enabled RFID Tags Placed At Known Reactor Heights," and SP2102-Wireless Monitoring and Profiling of Reactor Conditions Using Plurality of Sensor-Enabled RFID Tags and Multiple Transceivers"; respectively, having Ser. Nos. 62/616,148; 62/616,185 and 62/616,155.

The invention requires the use of radio frequency identification (RFID) sensors to measure or sense one or more process conditions existing within the reaction zone of a reactor vessel followed by transmission of the measured information to an RFID reader antenna by way of an RFID transponder signal that contains information representative of the measured information.

In this specification, the term RFID sensor means a device that includes a sensor configured or integrated with or operatively connected to a passive RFID tag. The sensor provides means for sensing a process condition or parameter within the reactor vessel and means for providing a signal input, which contains information representative of the particularly measured process condition, to the RFID tag. Passive RFID tags taught in the art include an integrated circuit coupled with a transponder antenna for receiving an interrogation signal from a RFID reader antenna and for transmitting a transponder signal.

In response to receiving an RFID reader interrogation signal, the RFID sensor transmits back to the RFID reader antenna an RFID transponder signal that includes information received from the sensor that is representative of the measured process condition. A computer processes the information contained in the received RFID transponder signal and provides output information regarding the measured or sensed process condition.

One particular feature of the invention is that it allows for the measurement of process and environmental conditions within a reactor vessel using a sensor device and for the wireless transmittal of RF signals containing the measured information through the reactor vessel to an RFID reader antenna connected to a reader that processes the information contained in the RF signals. The invention provides for this even though the transmitted RF signals pass through a bed of catalyst particles or a vessel filled with hydrocarbons or a combination of both. The interrogator RF signals and transponder RF signals pass through the catalyst bed and hydrocarbons contained inside the reactor vessel with little distortion or attenuation that prevents the wireless monitoring of the process conditions within the reactor.

In order to measure the conditions within the reactor vessel, the RFID sensor is placed at a location within the reaction zone defined by the reactor vessel. The reaction zone is a volume that may be void or contain gas or liquid that is selected from any type of fluid, including water, hydrocarbons, and other chemicals. Examples of hydrocarbons include naphtha, kerosene, diesel, gas oil, and heavy oil such as resid. Typically, the reaction zone contains a bed of catalyst particles, and it further can contain, along with the catalyst particles, any of the aforementioned fluids, preferably, a hydrocarbon fluid.

The catalyst particles in the reaction zone may be of any size and shape typically used in industry, including extrudates of any shape (e.g., cylinders, dilobes, trilobes, and quadralobes), spheres, balls, irregular aggregates, pills and powders. The catalyst particle sizes can be in the range of from 0.1 mm to 200 mm, but, more typically, the size of the catalyst particles is in the range of from 0.5 mm to 100 mm, or from 1 mm to 20 mm, and they may have any composition.

Common catalyst compositions include an inorganic oxide component, such as, silica, alumina, silica-alumina, and titania. The catalyst composition further can comprise a catalytic metal component, such as any of the transition metals, including chromium, molybdenum, tungsten, rhenium, iron, cobalt, nickel, palladium, platinum, gold, silver, and copper. The concentration of the metal components of the catalyst particles may be upwardly to 60 wt. %, based on metal, regardless of its actual state, and, typically, the metal concentration is in the range of from 0.1 to 30 wt. %, based on metal, regardless of its actual state.

Before the invention, scientists and engineers thought that RF signals could not pass through a bed of catalyst particles without significant attenuation or distortion due to the presence of metal concentrations on the catalyst particles and due to the catalyst bed thickness. This attenuation would prevent RF waves from passing to and from a transceiver and thus be unreadable. A feature of this invention, however, provides for the placement of the RFID sensor within the catalyst bed of the reaction zone such that catalyst particles surround the RFID sensor. The catalyst particles comprise an inorganic oxide component or a metal component, or both components, as described above.

The reactor vessel of the invention may be any suitable vessel made with any suitable material known to those skilled in the art. In many applications, the reactor vessel generally defines a volume that contains catalyst and into which is introduced reactants or feedstocks. In one embodiment of the invention, the reactor vessel defines a reaction zone within which is a catalyst bed. The reactor vessel is equipped with an inlet that provides fluid communication into the reaction zone and means for introducing a feed stream, such as hydrocarbons as described above, into the reaction zone. The reactor vessel is also equipped with an outlet that provides fluid communication from the reaction zone and means for removing an effluent stream, such as reaction products, from the reaction zone.

The sensor-enabled RFID tag, also referred to herein as an RFID sensor, is placed at a desired location in the reaction zone in order to measure a local process condition. This desired location is a spot at which a particular process condition is measured and from which an RFID transponder signal, which includes or carries information representative of the measured reactor condition, is wirelessly transmitted to the RFID reader antenna.

In an embodiment of the invention, the RFID sensor is placed within the catalyst bed of the reaction zone so that the RFID sensor is surrounded by catalyst particles. For a typical reactor, the geometric dimensions of depth and width define the catalyst bed. For reactors that are definable by depth and width, a typical depth of the catalyst bed is in the range of from 0.5 to 20 meters, and a typical effective width of the catalyst bed is in the range of from 0.5 to 20 meters. Thus, the RFID sensor can be surrounded by a layer or envelop of catalyst particles having a thickness upwardly to 20 meters requiring the interrogation and transponder signals to pass through a bed thickness of catalyst particles of from about 0.5 to about 20 meters.

Since the sensor-enabled RFID tag is passive, the RFID transponder signal is transmitted in response to receiving an interrogation signal that is transmitted by the RFID reader antenna. As noted above, the sensor is integrated with an RFID tag and is capable of sensing one or more conditions within the reaction zone. The sensor component of the RFID sensor may be selected from among temperature sensors, pressure sensors, chemical sensors, humidity sensors and any combination thereof. The sensor is integrated with an RFID tag to provide means for sensing a reactor condition, receiving an interrogation signal, and responsive to the interrogation signal, transmitting an RFID transponder signal containing information that is representative of the measured reactor condition. The patent publications US 2013/0057390, U.S. Pat. Nos. 9,563,833, 9,412,061, 9,035,766, and WO 03/098175 present examples of sensor-enabled RFID tags. These patent publications are incorporated herein by reference.

An RFID reader antenna is placed at any location that is remote to the RFID sensor; provided, that, it is wirelessly linked with the RFID sensor by being able to communicate with the RFID sensor by the transmission of an interrogator signal to the RFID sensor and reception of a responsive transponder signal from the RFID sensor.

It is preferred to position the RFID reader antenna within the reaction zone since this eliminates the need for the interrogator signal and the transponder signal to pass through the wall of the reactor vessel. However, another embodiment of the inventive system is to position or place the RFID antenna external to the reactor vessel. The RFID reader antenna is connected with a reader that provides an interrogation signal to the RFID reader antenna and provides for receiving the RFID transponder signal. A computer processes the RFID transponder signal information provided via the reader and it displays or otherwise provides an output relating information about conditions within the reaction zone.

Figure 1:
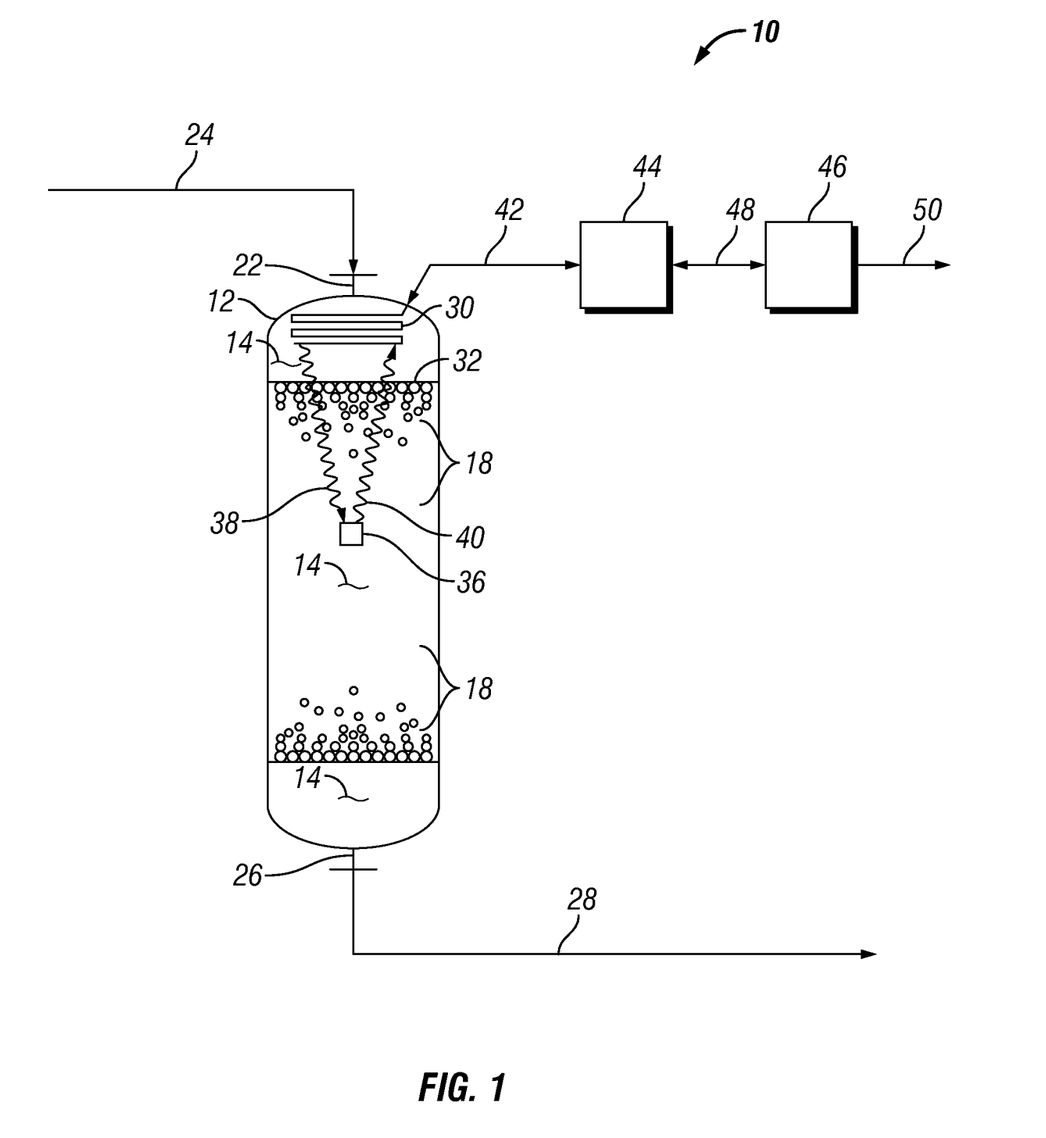
FIG. 1 is a schematic that is representative of an embodiment of the inventive system for wirelessly monitoring process conditions within a reactor vessel.

Now referring to FIG. 1, which is a schematic representation of an embodiment of inventive system 10 for wirelessly monitoring process conditions within a reactor vessel 12. Reactor vessel 12 defines reaction zone 14, which contains catalyst bed 16 that comprises catalyst particles 18. Reactor vessel 12 is equipped with inlet nozzle 22 that is operatively connected to conduit 24. Inlet nozzle 22 provides means for fluid communication through conduit 24 and means for introducing a feed into reaction zone 14.

Reactor vessel 12 is also equipped with outlet nozzle 26 that is operatively connected to conduit 28. Outlet nozzle 26 provides means for fluid communication through conduit 28 and means for removing an effluent from reaction zone 14.

FIG. 1 shows one embodiment of inventive system 10 that includes RFID reader antenna 30 positioned within reaction zone 14. While the figure shows RFID reader antenna 30 as located above surface 32 of catalyst bed 16, it is understood that RFID reader antenna 30 may be placed anywhere within reaction zone 14, including within the boundary of and surrounded by catalyst particles of catalyst bed 16. It is important, however, to position the RFID reader antenna 30 so that it is wirelessly linked to and capable of wirelessly communicate with RFID sensor 36 by the transmission of an interrogation signal 38 and the receipt of a transponder signal 40.

As an alternative embodiment of inventive system 10, RFID reader antenna 30 is positioned at a location external to reaction zone 14 and reactor vessel 12. As with an internally placed RFID reader antenna, it is important to position the RFID reader antenna 30 so that it is wirelessly linked to and capable of wirelessly communicating with RFID sensor 36, but it may be placed at any location external to reactor vessel 12 that permits this.

Placement of RFID sensor 36 at a desired location within reaction zone 14 provides for measuring a process condition near to or within an envelope surrounding RFID sensor 36. FIG. 1 depicts RFID sensor 36 that is located within catalyst bed 16 and, thus, a volume or layer of catalyst particles 18 surrounds it. This results in requiring interrogation signal 38 and transponder signal 40 to pass through a thickness of packed catalyst particles of upwardly to 20 or more meters, depending upon the location of RFID sensor 36 within catalyst bed 16, to communicate with RFID reader antenna 30.

RFID reader antenna 30 is operatively connected by cable 42 to reader 44. Reader 44 provides means for providing the interrogation signal 38 to RFID reader antenna 30 and means for receiving the transponder signal 40 from RFID reader antenna 30. Computer 46 and reader 44 are configured together by cable 48, which provides means for communicating between reader 44 and computer 46. Computer 46 provides means for processing the transponder signal 40 from RFID reader antenna 30 and for providing output information 50 relating to the measured reactor conditions for display or storage in memory.

Figure 2:
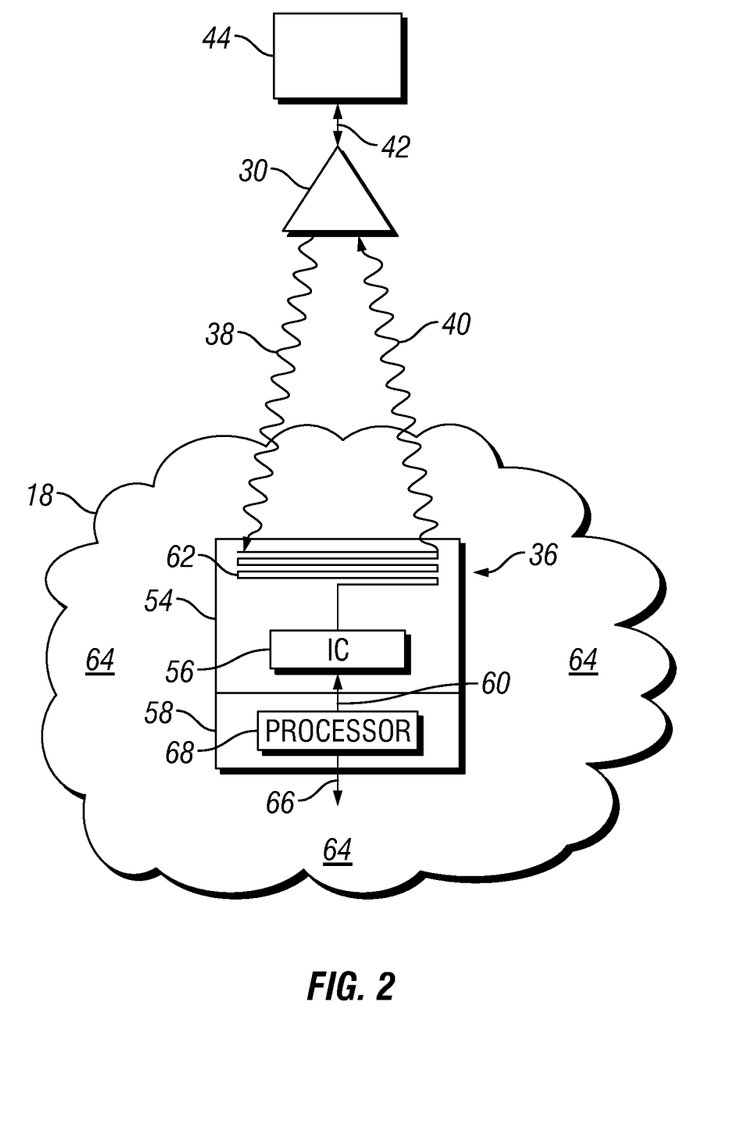
FIG. 2 is a diagram of an RFID system that includes a sensor-enabled RFID tag within an environment and an RFID reader/interrogator that is wirelessly linked to the sensor-enabled RFID tag and connected to a computer for processing the information contained in the RF signal.

FIG. 2 presents an enlarged detail diagram of RFID sensor 36 in relationship with certain other elements of RFID system 10. RFID sensor 36 comprises passive RFID tag 54 that includes an integrated circuit 56 providing for storage and processing of input information received from sensor 58 by connection 60.

Integrated circuit 56 is operatively connected to RFID tag antenna 62 providing means for transmitting an RFID transponder signal 40 that carries information representative of a reactor condition in surroundings or envelop 64 or near or close to RFID sensor 36. RFID tag antenna 62 also is capable of receiving interrogation signal 38 that is transmitted by RFID reader antenna 30. RFID reader antenna 30 is operatively connected by cable 42 to reader 44.

RFID tag 54 is configured or integrated with sensor 58 so that sensor 58 is capable of providing a sensor input signal to integrated circuit 56 of RFID tag 54 by way of connection 60. Sensor 58 is capable of sensing or detecting a process or environmental condition within its surroundings 64 by use of element 66 or any other suitable sensing means capable of providing an analog or digital input via processor 68 to integrated circuit 56 that is representative of the process or environmental condition measured. Integrated circuit 56 provides for the modulation of RFID transponder signal 40 responsive to sensor input signal provided via connection 60 so that it includes or carries information that is representative of the measured environmental condition within surroundings 64. Contained within surroundings 64 are catalyst particles 18.

The following Example illustrates certain features of the invention, but it is not intended to limit the invention in any way.

EXAMPLE

The purpose of the experiment described in this Example was to determine the ability of transmitted RF signals to pass through a catalyst bed of metal-containing catalyst particles and to be received with a minimum of attenuation or distortion.

Two test vessels were used in the experiment. One vessel was assembled with a 12-inch diameter by 10 feet in height PVC pipe, and the second vessel was assembled with a 12-inch diameter by 10 feet in height schedule 40 (0.406-inch wall thickness) carbon steel pipe. An RF receiver plate (antenna) was placed at the bottom of the vessel. An RF transmitter plate (antenna) was placed within the vessel with a lift guide that provided for raising and lowering of the RF transmitter antenna to predetermined locations within the vessel. This allowed the placement of predetermined depths of catalyst bed between the transmitter and receiver antennas. The vessel was filled with commercially available hydroprocessing ⅛ inch extrudate catalyst particles that contained nickel and molybdenum catalytic metal components to form the catalyst bed.

A series of tests were conducted with an empty vessel to obtain baseline data for the passage of the RF signal through air, and then to obtain opacity data for the passage of the RF signal through the dry catalyst bed and the catalyst bed filled with liquid diesel hydrocarbon. Measurements were taken at increments of catalyst bed height from one foot up to a depth of 8 feet of catalyst bed. A directional high gain antenna and a wide-band low gain antenna were used to transmit the RF signals over a frequency range of from 500 MHz to 5 GHz.

Figure 3:
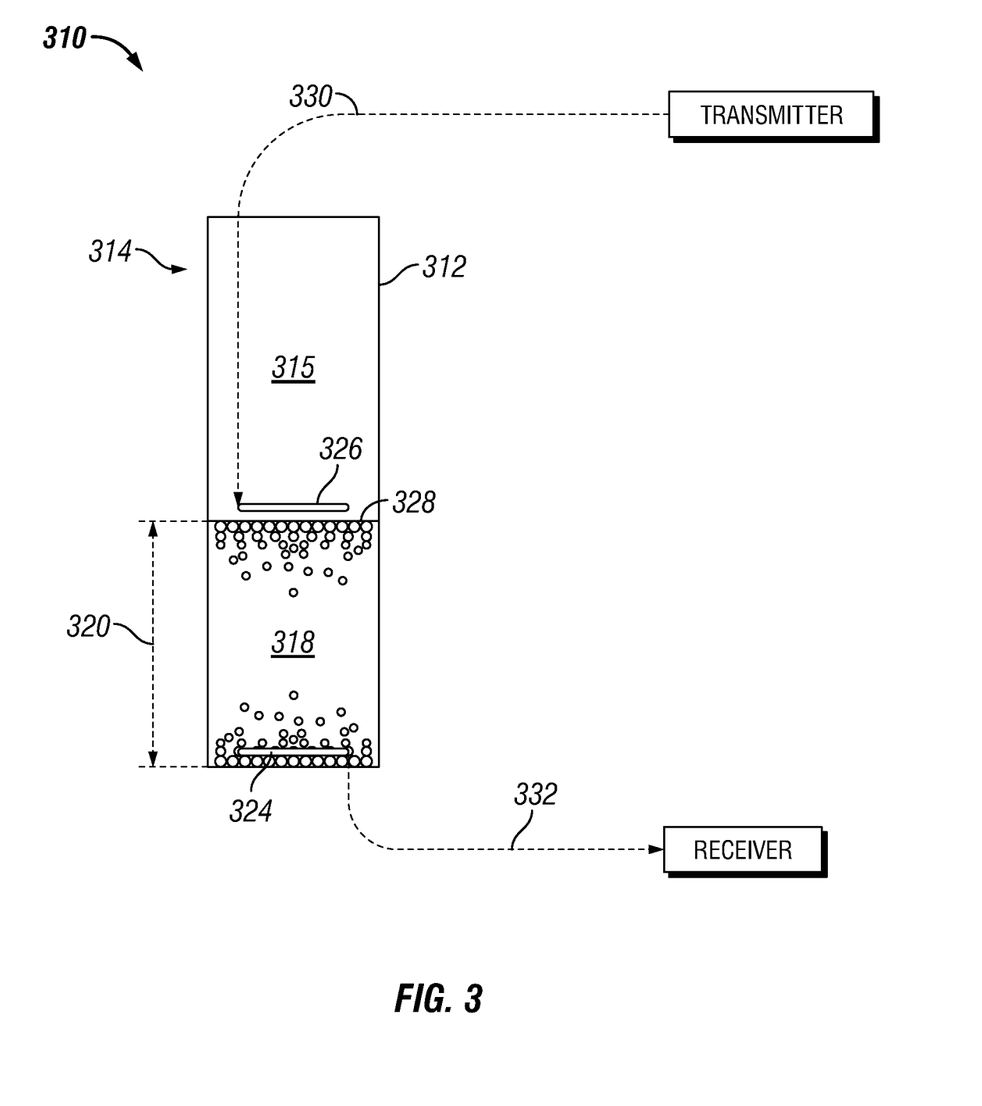
FIG. 3 is a schematic that is representative of the experimental equipment used to test for the attenuation of RF signals passing through a catalyst bed and through liquid hydrocarbons relative to air.

FIG. 3 presents a diagram representative of the equipment setup used to conduct the experiment. Shown is testing system 310. Testing system 310 included pipe 312 that defined vessel 314 and its volume 316 within which was contained catalyst bed 318 having bed height 320. Catalyst bed 318 included a bed of catalyst particles that comprise alumina extrudates having incorporated therein concentrations of nickel and molybdenum catalytic metal components. Bed height 320 was varied throughout the testing.

RF receiver plate or antenna 324 was placed at the bottom of vessel 314 and below catalyst bed 318. Antenna 324 received RF signals transmitted by RF transmitter plate or antenna 326 that was placed above or near top surface 328 of catalyst bed 318. RF transmitter antenna 326 was operatively connected to transmission cable 330 and provided for transmitting RF signals of various frequencies in the range of from 500 MHz to 5 GHz. These RF signals passed through catalyst bed 318 and are collected or received by RF receiver antenna 324. RF receiver antenna was operatively connected to receiver cable 332 and provided for receiving RF signals transmitted by RF transmitter antenna 326 and passing through catalyst bed 318.

Figure 4:
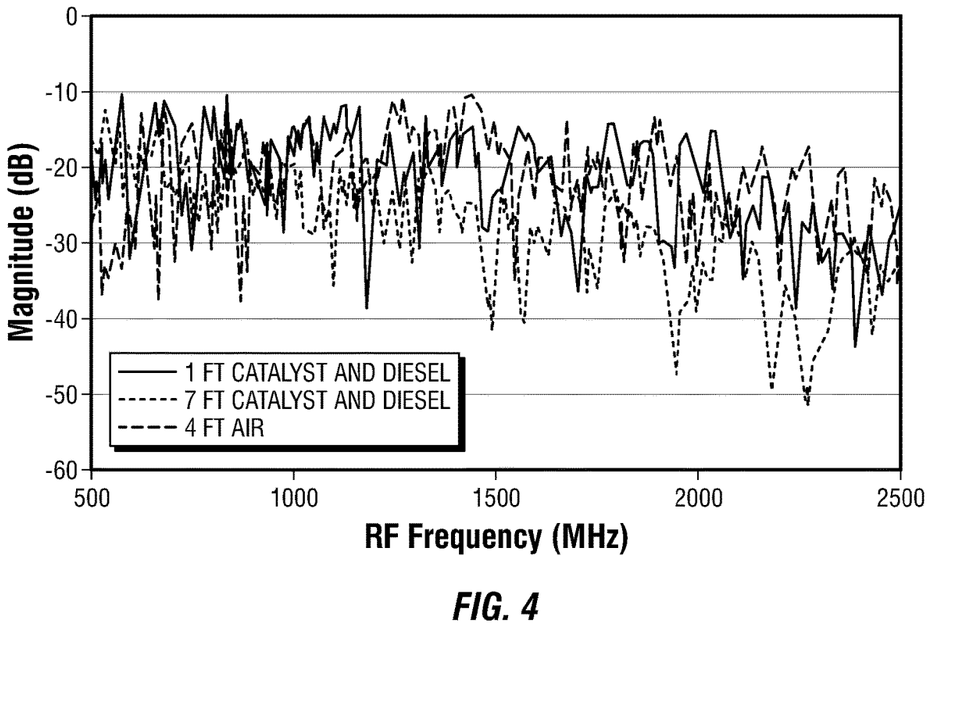
FIG. 4 is a graph presenting the strength of an RF signal as a function of RF frequency in the range of from 500 MHz to 2.5 GHz for the passage of the RF signal through 4 feet of air, one foot of catalyst and diesel oil, and 7 feet of catalyst and diesel oil.

FIG. 4 presents a graph comparing the RF signal loss at 4 feet of air with the RF signal strength after passing through a one-foot bed of catalyst filled with liquid diesel hydrocarbon and through a 7-foot bed of catalyst filled with liquid diesel hydrocarbon.

The results presented in FIG. 4 unexpectedly show that the RF signals can be transmitted through a catalyst bed and received by a receiver antenna without significant attenuation or reduction in their strength relative to that of air. The data presented in the FIG. 4 graph demonstrate that the received RF signal strength is closely comparable to the RF signal that is transmitted through open air. This is unexpected; because, it was previously believed that the RF signals would be negatively affected or distorted and weakened by the catalyst bed, metal components of the catalyst particles, and the liquid hydrocarbon within the vessel. This would have resulted in preventing or significantly inhibiting the RF signals from traversing through the catalyst bed and receipt by the RF receiver antenna.

What is claimed is:

1. A system for wirelessly monitoring process conditions within a reactor vessel, wherein the system comprises:
   the reactor vessel that defines a reaction zone; wherein within the reaction zone is a catalyst bed comprising catalyst particles, and wherein within the catalyst bed is an RFID sensor configured to sense a reactor condition within the reaction zone, receive an interrogation signal, and in response to the interrogation signal, transmit an RFID transponder signal that includes information representative of the reactor condition; and
   an RFID reader antenna that is wirelessly linked to the RFID sensor and configured to transmit the interrogation signal and receive the RFID transponder signal that is responsive to the interrogation signal.

2. The system of claim 1, wherein the catalyst particles comprise an inorganic oxide component and a metal component.

3. The system of claim 2, wherein the RFID sensor comprises an RFID tag operatively connected to sensor means for sensing the reactor condition and providing a sensor input to the RFID tag representative of the reactor condition, wherein the sensor is configured with the RFID tag to provide the RFID transponder signal including information representative of the reactor condition.

4. The system of claim 3, wherein the RFID reader antenna is positioned external to the reactor vessel.

5. The system of claim 4, wherein the reactor condition is selected from the group of environmental conditions consisting of pressure, temperature, chemical composition, vapor and liquid composition, density, flow rate, pH, vibration, radiation, magnetic flux, light intensity and sound intensity.

6. The system of claim 5, wherein the RFID reader antenna is operatively connected to a reader for providing the interrogation signal to the RFID reader antenna and for receiving the RFID transponder signal from the RFID reader antenna.

7. The system of claim 6, further including computing means configured with the reader and providing for the processing of the RFID transponder signal to provide output information relating to the reactor condition.

8. The system of claim 3, wherein the RFID reader antenna is positioned within the reaction zone of the reactor vessel.

9. The system of claim 8, wherein the reactor condition is selected from the group of environmental conditions consisting of pressure, temperature, chemical composition, vapor and liquid composition, density, flow rate, pH, vibration, radiation, magnetic flux, light intensity and sound intensity.

10. The system of claim 9, wherein the RFID reader antenna is operatively connected to a reader for providing the interrogation signal to the RFID reader antenna and for receiving the RFID transponder signal from the RFID reader antenna.

11. The system of claim 10, further including computing means configured with the reader and providing for the processing of the RFID transponder signal to provide output information relating to the reactor condition.

12. The system of claim 1, wherein the RFID sensor is surrounded by the catalyst particles.

13. The system of claim 12, wherein a thickness of the catalyst particles surrounding the sensor-enabled RFID tags of the plurality is from about 0.5 to about 20 meters.

14. The system of claim 1, wherein the RFID sensor comprises a passive RFID tag.

15. A method of monitoring process conditions within a reactor vessel, wherein the method comprises:
providing the reactor vessel that defines a reaction zone within which is a catalyst bed comprising catalyst particles and an RFID sensor that is wirelessly linked to an RFID reader antenna;
transmitting by the RFID reader antenna an interrogation signal, which is received by the RFID sensor; and
transmitting by the RFID sensor, in response to the interrogation signal, an RFID transponder signal that includes information representative of a reactor condition within the reaction zone and which is received by the RFID reader antenna.

16. The method of claim 15, wherein the catalyst particles comprise an inorganic oxide component and a metal component.

17. The method of claim 16, wherein the RFID sensor comprises an RFID tag operatively connected to a sensor which senses the reactor condition and provides a sensor input to the RFID tag that is representative of the reactor condition; and providing the RFID transponder signal that includes information representative of the reactor condition.

18. The method of claim 17, wherein the RFID reader antenna is positioned external to the reactor vessel.

19. The method of claim 17, wherein the reactor condition is selected from the group of process conditions consisting of pressure, temperature, chemical composition, vapor and liquid composition, density, flow rate, pH, vibration, radiation, magnetic flux, light intensity and sound intensity.

20. The method of claim 19, comprising: providing a reader which provides the interrogation signal to the RFID reader antenna and receives the RFID transponder signal from the RFID reader antenna.

21. The method of claim 20, further comprising: providing computing means configured with the reader; processing the RFID transponder signal; and displaying or providing output information relating to the reactor condition.

22. The method of claim 17, wherein the RFID reader antenna is positioned within the reaction zone of the reactor vessel.

23. The method of claim 22, wherein the reactor condition is selected from the group of process conditions consisting of pressure, temperature, chemical composition, vapor and liquid composition, density, flow rate, pH, vibration, radiation, magnetic flux, light intensity and sound intensity.

24. The method of claim 23, further comprising: providing a reader that provides the interrogation signal to the RFID reader antenna and receives the RFID transponder signal from the RFID reader antenna.

25. The method of claim 24, further comprising: providing a computer configured with the reader; processing the RFID transponder signal; displaying or providing output information relating to the reactor condition.

26. The method of claim 15, wherein the RFID sensor is surrounded by the catalyst particles.

27. The method of claim 15, wherein the interrogation and responsive signals pass through a bed thickness of catalyst particles of from about 0.5 to about 20 meters.

28. The method of claim 15, wherein the RFID sensor comprises a passive RFID tag.

* * * * *

UNITED STATES PATENT AND TRADEMARK OFFICE
CERTIFICATE OF CORRECTION

| | | |
|---|---|---|
| PATENT NO. | : 11,688,926 B2 | Page 1 of 1 |
| APPLICATION NO. | : 16/960783 | |
| DATED | : June 27, 2023 | |
| INVENTOR(S) | : Kaspar Joseph Vogt | |

It is certified that error appears in the above-identified patent and that said Letters Patent is hereby corrected as shown below:

In the Specification

In Column 1, Lines 8-11, delete "The present application claims the benefit of U.S. Provisional Patent Application Ser. No. 62/616,166, filed on 11 Jan. 2018, the entire disclosure of which is hereby incorporated by reference." and insert -- This is a national stage application of International application No. PCT/US2019/012843, filed 09 Jan. 2019, which claims priority of U.S. Provisional Application No. 62/616,166, filed 11 Jan. 2018. --.

Signed and Sealed this
Thirty-first Day of October, 2023

*Katherine Kelly Vidal*

Katherine Kelly Vidal
*Director of the United States Patent and Trademark Office*